US012769825B2

(12) United States Patent
Knierim et al.

(10) Patent No.: US 12,769,825 B2
(45) Date of Patent: Oct. 20, 2026

(54) DYNAMIC INTEGRITY MONITORING OF A CONTAINER RUNTIME ENVIRONMENT EXECUTED ON A HOST COMPUTER

(71) Applicant: Siemens Aktiengesellschaft, Munich (DE)

(72) Inventors: Christian Knierim, Munich (DE); Thomas Maier, Kirchseeon (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 46 days.

(21) Appl. No.: 18/847,354

(22) PCT Filed: Mar. 8, 2023

(86) PCT No.: PCT/EP2023/055854

§ 371 (c)(1),
(2) Date: Sep. 16, 2024

(87) PCT Pub. No.: WO2023/180069

PCT Pub. Date: Sep. 28, 2023

(65) Prior Publication Data

US 2025/0200170 A1 Jun. 19, 2025

(30) Foreign Application Priority Data

Mar. 21, 2022 (EP) .................................... 22163245

(51) Int. Cl.

*G06F 21/53* (2013.01)
*G06F 9/455* (2018.01)
*G06F 21/57* (2013.01)

(52) U.S. Cl.

CPC .......... *G06F 21/53* (2013.01); *G06F 9/45558* (2013.01); *G06F 21/57* (2013.01);
(Continued)

(58) Field of Classification Search

CPC ......... G06F 2009/45587; G06F 21/554; G06F 21/566; G06F 21/577; H04L 63/20; H04L 63/102; H04L 63/105; H04L 41/28
See application file for complete search history.

(56) References Cited

U.S. PATENT DOCUMENTS

2018/0314846 A1 11/2018 Schultz et al.
2020/0218798 A1* 7/2020 Kosaka .................. G06F 9/451
(Continued)

OTHER PUBLICATIONS

PCT International Search Report of International Searching Authority mailed Apr. 21, 2023 corresponding to PCT International Application No. PCT/EP2023/055854 filed Mar. 8, 2023.

*Primary Examiner* — Olugbenga O Idowu
(74) *Attorney, Agent, or Firm* — Schmeiser Olsen PLLC

(57) ABSTRACT

A method for the dynamic integrity monitoring of a container runtime environment executed on a host computer, in which environment at least one container is executed and is managed by an orchestration device, including: in the orchestration device, when a container instance is started in the container runtime environment by the orchestration device, creating an instance-specific integrity rule concerning at least one resource of the host computer, adding the instance-specific integrity rule to form a host-computer-specific integrity standard which includes an instance-specific integrity rule for each container instance already executed in the container runtime environment, transmitting the host-computer-specific integrity standard to the host computer; in the host computer, checking the resources on the host computer allocated by container instances against the host-computer-specific integrity standard, and outputting an alarm message if the check reveals a breach of the host-computer-specific integrity standard.

14 Claims, 3 Drawing Sheets

(52) U.S. Cl.
CPC .............. *G06F 2009/45587* (2013.01); *G06F 2009/45591* (2013.01)

(56) References Cited

U.S. PATENT DOCUMENTS

2021/0133312 A1 5/2021 Sugandhi et al.
2022/0255966 A1* 8/2022 Sienicki .............. G06F 11/1464

* cited by examiner

DYNAMIC INTEGRITY MONITORING OF A CONTAINER RUNTIME ENVIRONMENT EXECUTED ON A HOST COMPUTER

CROSS-REFERENCE TO RELATED APPLICATIONS

This application is a national stage of PCT Application No. PCT/EP2023/055854, having a filing date of Mar. 8, 2023, which claims priority to EP application Ser. No. 22/163,245.8, having a filing date of Mar. 21, 2022, the entire contents both of which are hereby incorporated by reference.

FIELD OF TECHNOLOGY

The following relates to methods for dynamic integrity-monitoring of a container runtime environment executed on a host computer, in which environment at least one container is executed and is managed by an orchestration device.

BACKGROUND

Container virtualization is a method in which several instances of an operating system are able to utilize an operating-system kernel of a host computer in isolation from one another. Software containers, called containers for short in the following, consequently, represent a lightweight type of virtualization of a runtime environment on a host computer, also called a host system, and encapsulate a software application being run in a container from the underlying host computer. Through the use of container technology, software applications are being implemented in many fields, for example in industrial automation and in process control, but also in transport systems or in building automation.

In order to be able to start a container on the host computer, a container image is needed that contains, besides the application software, also the binary programs and libraries required for the application software. From the container image, a container, more precisely a container instance, is created on the host computer and is executed in the runtime environment of the host computer.

An orchestrated runtime environment comprises an orchestrator and at least one host computer, usually a plurality of host computers, also designated as nodes, that have been assigned to the orchestrator. The orchestrator starts, manages and terminates container instances on the assigned host computers. Typical orchestrated runtime environments are Kubernetes-based container environments that manage either cloud-based container-as-a-service environments or virtual instances being run in a cloud as nodes of an orchestrated runtime environment.

In addition to use of orchestrated runtime environments in the IT sphere, these environments are also employed in the sphere of the industrial Internet of things (IoT). In contrast to the typical Kubernetes scenario described above, in the case of appliances that are operated in the industrial sphere as nodes of an orchestrated runtime environment, it is not customary for container instances to be run on the appliance ephemerally, typically for a maximum of 24 hours, but rather they run without interruption for a relatively long period of time, that is to say from several days to weeks. If an attacker obtains unauthorized access to a node, he or she can install additional software on the node managed by the central orchestration unit, or can modify the node. In embodiments, in such environments, amongst other things, container instances can be started in parallel with the instances managed by the orchestration component, without the orchestrator becoming aware of this or being able to prevent this procedure.

Known integrity-monitoring systems cannot optimally detect dynamic start-procedures and stop-procedures of individual container instances instigated by the orchestrator, but are based on a static set of rules that can be extended where appropriate by interrogation of orchestrator-specific deployment information. For the purpose of creating the static set of rules, all the applications have to be known, or since this is seldom the case, the sets of rules have to be defined very generously.

SUMMARY

An aspect relates to a method that is able to carry out monitoring of the integrity of a node automatically and as a function of a runtime configuration defined by the orchestrator, and is consequently able to carry out a comparison on the target node as to whether instances were actually started by the orchestrator and whether the runtime configuration, specified by the orchestrator, of all the instances being run on the node is identical to the specifications of the orchestrator.

According to a first aspect, embodiments of the invention relate to a method for dynamic integrity-monitoring of a container runtime environment executed on a host computer, in which environment at least one container is executed and is managed by an orchestration device, comprising the steps:

in the orchestration device,
- creating, in the course of the starting of a container instance in the container runtime environment by the orchestration device, an instance-specific integrity rule concerning at least one resource of the host computer that has been allotted for the purpose of executing the container instance,
- adding the instance-specific integrity rule to a host-computer-specific integrity guideline which comprises an instance-specific integrity rule for each container instance already being executed in the container runtime environment of the host computer and which is arranged in the orchestration device,
- communicating the host-computer-specific integrity guideline to the host computer, in the host computer,
- checking the resources allocated on the host computer by container instances against the host-computer-specific integrity guideline, and
- outputting an alarm message if a violation of the host-computer-specific integrity guideline was ascertained in the course of the checking.

The instance-specific integrity rule comprises an integrity rule or a plurality of integrity rules, each of which concerns one or more resources of the host computer that have been allocated to the container instance. The host-computer-specific integrity guideline relates to the entire host computer, that is to say to all the container instances being executed in the runtime environment and to the resources of the host computer that are managed for this purpose. The host-computer-specific integrity guideline is created for each host computer managed by the orchestration device, for example in the course of the assignment of the host computer to the orchestration unit or in the course of the first start of a container instance on the host computer. The host-computer-specific integrity guideline is updated upon each further start of a container instance on the host computer that is instigated by the orchestration device, and is consequently updated dynamically. By virtue of the communicating and checking of the host-computer-specific integrity guideline in the host computer, container instances not started by the orchestration device, or resources deviating from the configuration of the started container instance, can be identified over the entire runtime of the container instance. By virtue of the integrating of the instance-specific integrity rule, monitoring of integrity can be carried out also for the host computer itself.

In an embodiment, the method includes the further steps:

receiving a notification in the orchestration device if one of the container instances on the host computer is terminated, and communicating a host-computer-specific integrity guideline, updated with respect to the notification, to the host computer.

The host-computer-specific integrity guideline is consequently updated not only if the orchestration device instigates a termination of the container instance but also when the termination is instigated by the host computer or when termination occurs by reason of a crash.

In an embodiment, the host-computer-specific integrity guideline is updated if an event that changes the composition and/or configuration of the container instances on the host computer is detected in the orchestration device, and the updated host-computer-specific integrity guideline is communicated to the host computer.

The host-computer-specific integrity guideline is consequently adapted by the orchestration device in the event of an amendment of the composition, that is to say which and how many container instances, but also in the event of an amendment of the configuration, for example of the allocated resources, of the container instances running on the host computer.

In an embodiment, the event is at least one of the following actions: a failure of a container instance on the host computer, starting of a new container instance on the host computer, updating of the container instance in accordance with an amended container image, detection of an application crash and restart of affected container instances on the host computer.

In an embodiment, the instance-specific integrity rule is created in a manner depending on information relating to a container image from which the container instance is constructed.

By virtue of the instance-specific integrity rule, safeguarding of integrity can be carried out for the host computer itself. The instance-specific integrity rule depending on information relating to the container image has the advantage that this rule can be merely duplicated and re-used for further container instances of the same container image.

In an embodiment, the instance-specific integrity rule is created in a manner depending on information from an item of provisioning information that specifies the configuration of the container instance at the start of the container instance in the respective container runtime environment.

In embodiments, when the configuration of the service defined within the container image, or the objective of write operations, is defined outside the container image and, in particular, with the aid of provisioning-specific variables or configuration files. A concrete example is represented by the provisioning of an advertising server that is employed several times in different contexts within a micro-segmented application. For example, there are container instances for the frontend component that are exposed to the outside, and there are non-exposed container instances in the backend that supply information for the overall application and that, for example, provide performance data, displayed in the frontend, pertaining to a control system.

In an embodiment, the host-computer-specific integrity guideline and/or the individual instance-specific integrity rules contained therein is/are protected by a digital signature of the orchestration device.

The host computer knows the associated public key of the orchestration device and can consequently check the integrity of the guideline or rules and also the signing device, that is to say the orchestration unit. A guideline or rule modified by an attacker can consequently be identified. The signing orchestration unit can be validated.

In an embodiment, the checking of the host-computer-specific integrity guideline concerns the resources of a file system allocated to the container instances, and/or concerns network-connection resources and/or process resources and/or executable program files.

Consequently, all the types of resources needed for the execution of the container instances on the host computer are checked.

In an embodiment, the checking of at least a part of the host-computer-specific integrity guideline is carried out outside the host computer.

This enables simple checking of resources swapped out from the host computer that are utilized by the container instances, for example swapped-out storage capacities.

In an embodiment, the alarm message is forwarded to a central alarm-triggering device, and alarm actions are executed by the alarm-triggering device in accordance with an alarm-triggering guideline.

Alarm actions can consequently be easily established and provided for all the linked host computers uniformly.

In an embodiment, the host-computer-specific integrity guideline has a predetermined maximum period of validity, and/or the host-computer-specific integrity guideline is updated at cyclic time intervals.

Consequently, old host-computer-specific integrity guidelines can be prevented from being secured by an attacker, and further updates by an attacker can be prohibited.

According to a further aspect, embodiments of the invention relate to a system for dynamic integrity-monitoring of a container runtime environment executed on a host computer, in which environment at least one container instance is executed and is managed by an orchestration device, including the host computer, including a container runtime environment, and also a receiving unit which is designed to receive a host-computer-specific integrity guideline, an integrity-detection unit which is designed to check resources allocated to at least one container instance against the host-computer-specific integrity guideline, and an output unit which is designed to output an alarm message if a violation of the host-computer-specific integrity guideline was ascertained in the course of the checking, and the orchestration device, including an integrity unit which is designed to create, in the course of the starting of a container instance in the container runtime environment by the orchestration device, an instance-specific integrity rule concerning at least one resource of the host computer that has been allotted for the purpose of executing the container instance, and to add the instance-specific integrity rule to a host-computer-specific integrity guideline which comprises an instance-specific integrity rule for each container instance already being executed in the container runtime environment of the host computer and which is arranged in the orchestration device, and an output unit which is designed to communicate the host-computer-specific integrity guideline to the host computer.

According to a further aspect, embodiments of the invention relate to a host computer including a container runtime environment and also a receiving unit which is designed to receive a host-computer-specific integrity guideline, an integrity-detection unit which is designed to check resources allocated to at least one container instance against the host-computer-specific integrity guideline, and an output unit which is designed to output an alarm message if a violation of the host-computer-specific integrity guideline was ascertained in the course of the checking.

According to a further aspect, embodiments of the invention relate to an orchestration device including an integrity unit which is designed to create, in the course of the starting of a container instance in the container runtime environment by the orchestration device, an instance-specific integrity rule concerning at least one resource of the host computer that has been allotted for the purpose of executing the container instance, and to add the instance-specific integrity rule to a host-computer-specific integrity guideline which comprises an instance-specific integrity rule for each container instance already being executed in the container runtime environment of the host computer and which is arranged in the orchestration device, and an orchestration interface which is designed to communicate the host-computer-specific integrity guideline to the host computer.

In embodiments, the system and also the host computer and the orchestration device are designed to execute the described method.

In embodiments, the system and also the orchestration device and the host computer have the same advantages as the method.

A further aspect of embodiments of the invention relate to a computer program product (non-transitory computer readable storage medium having instructions, which when executed by a processor, perform actions) comprising a non-volatile computer-readable medium which is directly loadable into a memory of a digital computer, comprising program code parts which, in the course of execution of the program code parts by the digital computer, cause the latter to carry out the steps of embodiments of the method.

Unless otherwise stated in the following description, the terms "start", "create", "add", "communicate", "check", "output" and such like preferentially relate to actions and/or processes and/or processing steps that change and/or generate the data and/or convert the data into other data, in which connection the data may be represented or may be present, in particular, as physical quantities, for example as electrical impulses.

In embodiments, the system, and components optionally included therein, such as, for example, the orchestration device and the host computer and such like, may include one or more processors. A processor may be, in particular, a main processor (central processing unit, CPU), a microprocessor or a microcontroller, for example an application-specific integrated circuit or a digital signal processor, possibly in combination with a memory unit for storing program instructions, etc.

A computer program product, such as, for example, a computer program means, can be provided or delivered, for example, as a storage medium, such as, for example, a memory card, a USB stick, a CD-ROM, a DVD, or even in the form of a downloadable file from a server in a network.

BRIEF DESCRIPTION

Some of the embodiments will be described in detail, with reference to the following figures, wherein like designations denote like members, wherein.

DETAILED DESCRIPTION

Known existing integrity-monitoring systems cannot optimally detect dynamic start procedures and stop procedures of individual container instances instigated by the orchestrator, but are based on a static set of rules that are extended where appropriate by interrogation of orchestrator-specific deployment information. With these methods, the operations or file system amendments at the orchestrated nodes are monitored, though they work independently of the specified runtime configuration of the orchestrator. Existing instances that were not started by the orchestrator can consequently only be detected if an anomaly-detection component is given access to, for example, metadata of the orchestrator at runtime. If the connection between the orchestrator and the node is interrupted, or if the attacker is in a position to generate an identical item of deployment information for a container instance without the orchestrator, this cannot be detected with the existing methods. The same applies to a possible licensing application in which, for example, it is to be ensured that containers for an application are to be installed exclusively via the orchestrator but are not to be installed on the appliance manually.

The basic idea of embodiments of the invention consists in that an orchestration device, or a management system of one or more nodes, creates, besides the orchestration of the container instance to be run on the nodes, appliance-specific integrity guidelines dynamically, in addition to the provisioning information, as a function of the runtime configuration specified by the orchestration device, and optionally carries out safeguarding of integrity for these guidelines with the aid of a signature. In the following, a node managed by the orchestration device will be designated as a host computer.

Figure 1:
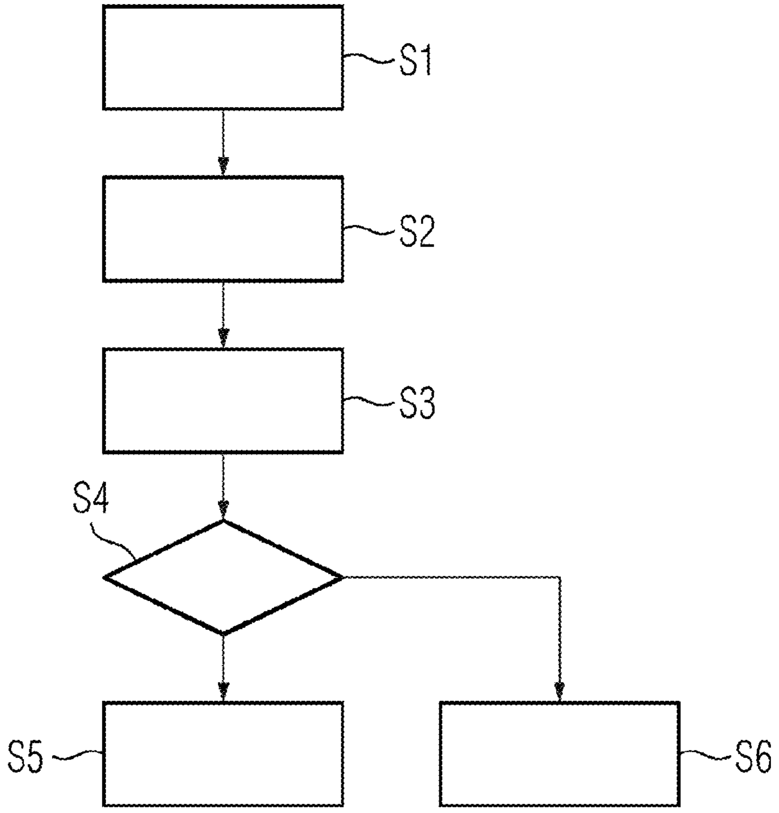
FIG. 1 shows an embodiment of the method as a flowchart.

With reference to the flowchart in FIG. 1, the method according to embodiments of the invention for dynamic integrity-monitoring of a container runtime environment executed on a host computer, in which environment at least one container is executed and is managed by the orchestration device, will now be described more precisely. For this purpose, a host-computer-specific integrity guideline is created as a function of the individual container instances executed on the appliance, or in the container runtime environment of the host computer. The host-computer-specific integrity guideline includes a static part which contains integrity rules for the entire operating system of the host computer, and which is extended by the instance-specific aspects. Monitoring of integrity for the host computer itself, or for the operating system of the host computer, is carried out by the static part of the host-computer-specific integrity guideline.

For individual container instances, instance-specific integrity rules are firstly defined in isolation. For this purpose, the following steps are executed by the orchestration device. In the first method step S1, an instance-specific integrity rule concerning at least one resource of the host computer that has been allotted for the purpose of executing the container instance is created in the course of the starting of a container instance in the container runtime environment by the orchestration device.

The instance-specific integrity rule is created in a manner depending on information relating to a container image from which the container instance is constructed. This information relating to the container image can, for example, be ascertained from meta-information relating to the container image. Alternatively or additionally, the instance-specific integrity rule can be created in a manner depending on information from an item of provisioning information that specifies the configuration of the container instance at the start of the container instance in the respective container runtime environment. The variant based on the provisioning information is to be desired to the extent that, for example, an objective of write operations or a configuration of services defined inside the container image is defined outside the container image and, in particular, with the aid of provisioning-specific variables or configuration files. In both variants, several instance-specific integrity rules can be combined with one another with the aid of one or more digital signatures of the orchestration device. The host-computer-specific integrity guideline is protected by a digital signature of the orchestration device.

Subsequently, the at least one instance-specific integrity rule is added to a host-computer-specific integrity guideline, see step S2. The host-computer-specific integrity guideline is arranged in the orchestration device and comprises at least one instance-specific integrity rule for each container instance already being executed in the container runtime environment of the host computer. A host-computer-specific integrity guideline is generated in the orchestration device, for example in the course of an assignment of a host computer to the orchestration device or in the course of starting a first container instance on the host computer. The host-computer-specific integrity guideline is communicated from the orchestration device to the host computer, see S3 and the containers.

In the course of the creation of the dynamic part of the host-computer-specific integrity guideline, it is ensured by the orchestration device that the instance-specific integrity rules specified by the container image and/or by the provisioning information relate exclusively to the resources defined in the container instance or in the provisioning information, and do not relate to conditions for the host computer itself or to the resources of other deployments, that is to say applications that are being executed by container instances on the same host computer. The reason for this is that the creator of a set of integrity rules should only be able to create integrity rules or integrity guidelines for his/her own application. This can be achieved by a check being made as to whether the integrity rules associated with the deployment relate exclusively to resources of the deployment or relate to the image or to the instance itself generated therefrom.

The host computer checks the resources that have been allocated to the container instances being executed on the host computer against the host-computer-specific integrity guideline, see step S4. If the allocated resources do not match the specifications from the host-computer-specific integrity guideline, an alarm message is output, see step S5. If the allocated resources match the specifications from the host-computer-specific integrity guideline, the check is terminated without further action, see step S6. In some embodiments, the check, the time of the check and the result of the check can be logged and stored. This enables a temporal classification of a deviation between actually allocated resources and host-computer-specific integrity guideline.

In order to be able to create a host-computer-specific integrity-monitoring guideline as a function of the container instances currently being executed for an application, the orchestration device updates the host-computer-specific integrity guideline upon each amendment affecting the host computer. To this end, a notification from the host computer is received in the orchestration device if one of the container instances on the host computer is terminated. Thereupon, the host-computer-specific integrity guideline is updated in the orchestration device in accordance with the notification and is communicated to the host computer.

If one of the container instances is terminated or fails, the host computer actively sends the notification to the orchestration device. Alternatively or additionally, the orchestration device sends a query concerning the status to the host computer. If the orchestration device is managing several host computers, the orchestration device carries out the described steps with each of the managed host computers. A detected failure of one or more of the container instances has the consequence that the orchestration device removes the instance-specific integrity rules for the container instances no longer existing from the host-computer-specific integrity guideline and generates an updated new host-computer-specific integrity guideline and communicates it to the host computer.

The host-computer-specific integrity guideline is updated whenever an event that changes the composition and/or the configuration of the container instances on the host computer is detected in the orchestration device, and the updated host-computer-specific integrity guideline is communicated to the host computer. Relevant events that result in updating of the host-computer-specific integrity guideline are the starting of at least one new container instance, for example by upscaling/downscaling for the purpose of providing greater resources for an application, the importing of at least one updated container image by adaptation of the provisioning configuration in the orchestration device, to the extent that this provisioning results in amendments on the desired host computer, a detection of application crashes and the restart thereof by the orchestration device, where appropriate on another host computer in accordance with scheduling policy.

In the course of safeguarding of integrity, the dynamically generated host-computer-specific integrity guideline should also have a maximum period of validity, and this guideline should be updated not only on an event-related basis. The host-computer-specific integrity guideline has a predetermined maximum period of validity. Alternatively and/or additionally, the host-computer-specific integrity guideline is updated at cyclic time-intervals.

Figure 2:
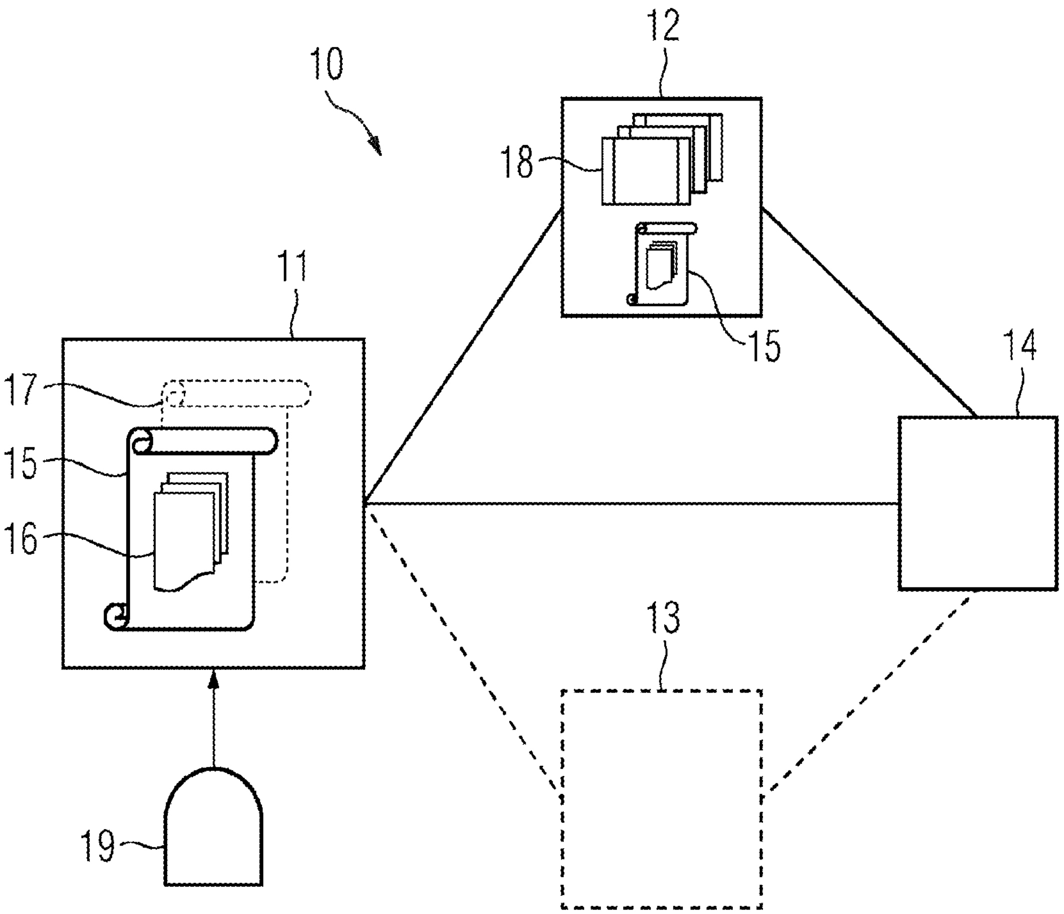
FIG. 2 shows an embodiment of a system in a schematic representation.

FIG. 2 shows an example of an application of the method in a system 10 according to embodiments of the invention including an orchestration device 11 and a host computer 12. In embodiments, the system 10 may include further host computers, here host computer 13, which are managed by the orchestration device 11. The orchestration device 11 creates and updates a host-computer-specific integrity guideline for each individual one of these host computers 12, 13, for example host-computer-specific integrity guideline 15 for host computer 12, and host-computer-specific integrity guideline 17 for host computer 13. The host-computer-specific integrity guideline 15 comprises an instance-specific integrity rule 16 for each container instance 18 executed on the host computer 12.

The importing of a container instance by a user 19 will be described with reference to embodiments of the system 10. After the orchestration device 11 has selected the host computer 12 for an execution of the container instance, the orchestration device 11 receives an instance identifier of the container instance 18 to be monitored from the container runtime environment on the host computer 12, and creates from the provisioning information of the container instance 18 the associated instance-specific integrity rule 16, and/or creates from the container-image signature the associated instance-specific integrity rule 16 a dynamic part of the host-computer-specific integrity guideline 15. The instance identifier can be supplemented by the orchestration device with an identifier characterizing the host computer. The dynamic part and also a static part with integrity rules for the operating system of the host computer constitute the host-computer-specific integrity guideline which is signed with a cryptographic key of the orchestration device 11. Subsequently, the host-computer-specific integrity guideline 15 is communicated to the host computer 12. In the next step, the container instance 18, for example, is started.

By virtue of the instance-specific assignment, that is to say the associated instance-specific integrity rule 16, it is ensured that triggering of an alarm can be carried out as soon as container instances started outside the orchestration device 11 are detected.

The checking of the host-computer-specific integrity guideline 15 concerns the resources of a file system allocated to the container instances 18, and/or concerns network-connection resources and/or process resources of the host computer 12. Such a method is executed, for example, by a "catch-all" rule, in the case of which processes of all the unknown container instances trigger an alarm by default.

The integrity of the file system of the host computer 12 can consequently be checked by reference to the appliance-specific integrity guideline 15. If the integrity of the file system is ascertained cyclically, a reference database for the files and directories to be monitored and also for the metadata thereof is ordinarily ascertained. Alternatively, infringements of integrity can be ascertained directly with the aid of appropriate dynamically generated audit rules or eBPF programs (extended Berkeley Packet Filter). To the extent that a detection is carried out with the aid of reference databases, the integrity monitoring has to be deactivated for each non-exclusive file-system resource both inside the container instance 18 and outside the container instance 18. If a resource is no longer being utilized because a container instance 18 is deleted, the container instance 18 fails or is terminated as planned, the status of the container instance is notified either directly by an active notification by the host computer 12, or by cyclic monitoring of the host computer 12 by the orchestration device 11. The orchestration device 11 can recalculate records of the integrity database defined for the terminated container instance, and does not have to compute the reference database completely.

By virtue of the checking of integrity rules for processes, processes started both within the process namespaces of individual container instances and on the underlying host computer can be monitored with respect to integrity. In order to be able to carry out the integrity monitoring in a manner specific to the container instance and to the host computer, the integrity monitoring has to detect whether a process belongs to a container instance. This is done with the aid of at least one eBPF program or at least one kernel module that ascertains embodiments of the system calls generated and also the transfer parameters thereof.

With the aid of integrity rules for network connections, for each instance, it can be monitored which network connections are expected and trigger an alarm in the event of violations of the guideline. Here too, the capture can be undertaken with the aid of appropriate eBPF programs or kernel modules that capture special system calls and analyze the transfer parameters thereof.

As soon as an integrity violation on the host computer 12 is established, an alarm message is generated which is communicated to an alarm-triggering device 14 which is arranged centrally and which processes alarm messages from several host computers 12, 13 or even for several orchestration devices 11. In the alarm-triggering device, alarm actions are executed in accordance with an alarm-triggering guideline and are forwarded to the orchestration device 11. Depending on the alarm actions in the alarm-triggering guideline, an operation is finally carried out in the orchestration device 11. For example, the host computer 12 is excluded from a scheduling for container instances of a predetermined container type.

Figure 3:
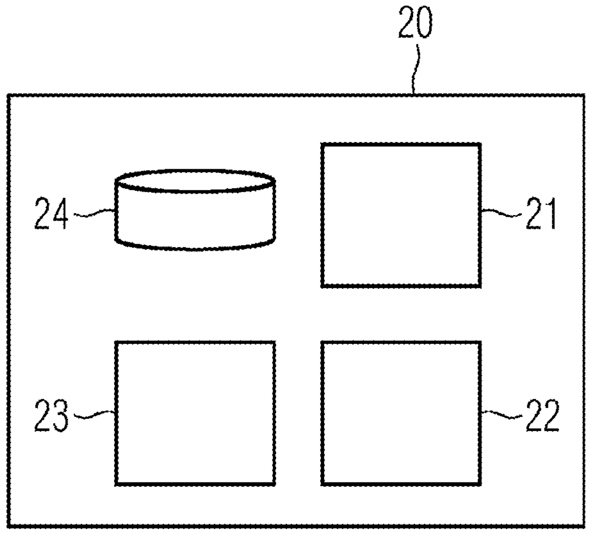
FIG. 3 shows an embodiment of an orchestration device in a schematic representation.

FIG. 3 shows an embodiment of an orchestration device 20 according to embodiments of the invention. The orchestration device 20 includes a user interface 21 via which a container instance is received from a user. The orchestration device 20 includes an orchestration interface 22 via which the host-computer-specific integrity guideline is communicated to a host computer managed by the orchestration device 20. The orchestration device 20 further includes a memory unit 24 in which the host-computer-specific integrity guidelines of the managed and integrity-monitored host computers have been stored. The orchestration device 20 includes an integrity unit in which instance-specific integrity rules for each container instance are created, and into which host-computer-specific integrity guidelines are inserted.

Figure 4:
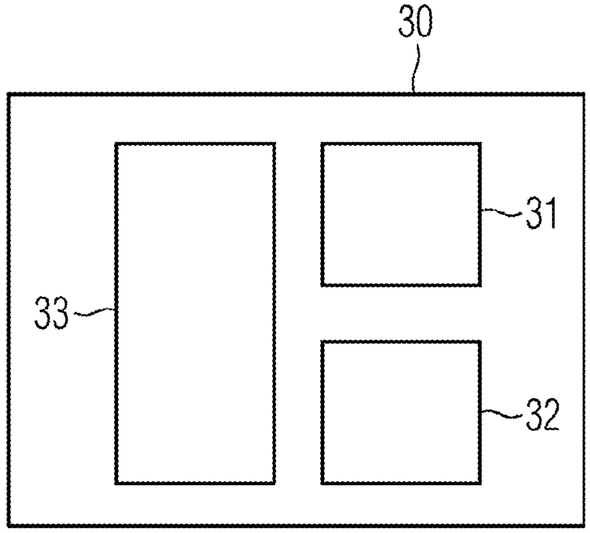
FIG. 4 shows an embodiment of a host computer in a schematic representation.

FIG. 4 shows a host computer 30. The host computer 33 includes an input unit which is designed to receive an appliance-specific integrity guideline from an orchestration device. The host computer includes an integrity-detection unit 33 for checking and detecting integrity violations and for generating an alarm message. For individual aspects, such as the integrity monitoring of the file system, a reference database may have been compiled in a device stored externally, separate from the host computer, which monitors the secured host computer from there via issued commands.

The integrity-detection unit 32 is designed to generate alarm messages and to forward them to a central alarm-triggering device via an output unit 21.

To the extent that the appliance-specific integrity guideline has been integrity-secured by a signature, the integrity-detection unit 33 being run on the host computer is able to check whether the appliance-specific integrity guideline has been compromised. To the extent that the integrity-detection unit 33 detects a compromised appliance-specific integrity guideline, an alarm is likewise triggered. From this point on, the entire host computer 30 is also considered to be compromised.

For the managed host computers, the appliance-specific integrity guideline is consequently adapted dynamically by the orchestration device upon each configuration amendment with respect to running container instances, and relates to the entire host computer. By virtue of the host-computer-specific dynamic creation of the integrity guideline, the orchestration device is able to detect if, in addition to the container instances defined by it, container instances being managed also outside the orchestration device are being run. Host computers identified as being compromised can be excluded by an alarm-triggering guideline from the orchestration device for the scheduling of defined container instances or of all container instances.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for dynamic integrity-monitoring of a container runtime environment executed on a host computer, wherein in the container runtime environment at least one container instance is executed and is managed by an orchestration device, the method comprising:

in the orchestration device;

creating, in a course of starting of the at least one container instance in the container runtime environment by the orchestration device, an instance-specific integrity rule concerning at least one resource of the host computer that has been allotted for a purpose of executing the at least one container instance;

adding the instance-specific integrity rule to a host-computer-specific integrity guideline which comprises an instance-specific integrity rule for each container instance already being executed in the container runtime environment of the host computer and which is arranged in the orchestration device;

communicating the host-computer-specific integrity guideline to the host computer, in the host computer;

checking the resources allocated on the host computer by container instances against the host-computer-specific integrity guideline;

outputting an alarm message if a violation of the host-computer-specific integrity guideline was ascertained in the course of the checking;

receiving a notification in the orchestration device if one of the container instances on the host computer is terminated; and communicating a host-computer-specific integrity guideline, updated with respect to the notification, to the host computer.

2. The method as claimed in claim 1, wherein the host-computer-specific integrity guideline is updated if an event that changes the composition and/or configuration of the container instances on the host computer is detected in the orchestration device, and the updated host-computer-specific integrity guideline is communicated to the host computer.

3. The method as claimed in claim 2, wherein the event is: a failure of a container instance on the host computer, starting of a new container instance on the host computer, updating of the container instance in accordance with an amended container image, and/or detection of an application crash and restart of affected container instances on the host computer.

4. The method as claimed in claim 1, wherein the instance-specific integrity rule is created in a manner depending on information relating to a container image from which the at least one container instance is constructed.

5. The method as claimed in claim 4, wherein the instance-specific integrity rule is created in a manner depending on information from an item of provisioning information that specifies the configuration of the at least one container instance at a start of the at least one container instance in the respective container runtime environment.

6. The method as claimed in claim 1, wherein the host-computer-specific integrity guideline and/or the individual instance-specific integrity rules contained therein is/are protected by a digital signature of the orchestration device.

7. The method as claimed in claim 1, wherein the checking of the host-computer-specific integrity guideline concerns the resources of a file system allocated to the container instances, and/or concerns network-connection resources and/or process resources.

8. The method as claimed in claim 1, wherein the checking of at least a part of the host-computer-specific integrity guideline is carried out outside the host computer.

9. The method as claimed in claim 1, wherein the alarm message is forwarded to a central alarm-triggering device, and alarm actions are executed by the alarm-triggering device in accordance with an alarm-triggering guideline.

10. The method as claimed in claim 1, wherein the host-computer-specific integrity guideline has a predetermined maximum period of validity, and/or the host-computer-specific integrity guideline is updated at cyclic time intervals.

11. A system for dynamic integrity-monitoring of a container runtime environment executed on a host computer, wherein in the container runtime environment at least one container instance is executed and is managed by an orchestration device, the system comprising:

the orchestration device, including an integrity unit which is configured:

to create, in a course of the starting of a container instance in the container runtime environment by the orchestration device, an instance-specific integrity rule concerning at least one resource of the host computer that has been allotted for a purpose of executing the container instance; and to add the instance-specific integrity rule to a host-computer-specific integrity guideline which comprises an instance-specific integrity rule for each container instance already being executed in the container runtime environment of the host computer and which is arranged in the orchestration device; and an orchestration interface which is configured to communicate the host-computer-specific integrity guideline to the host computer; and the host computer, including a container runtime environment;

a receiving unit which is configured to receive a host-computer-specific integrity guideline, an integrity-detection unit which is configured to check resources allocated to at the least one container instance against the host-computer-specific integrity guideline; and an output unit which is configured to output an alarm message if a violation of the host-computer-specific integrity guideline was ascertained in a course of the checking;

wherein the orchestration device is further configured to receive a notification if one of the container instances on the host computer is terminated, and the orchestration interface is further configured to communicate a host-computer-specific integrity guideline, updated with respect to the notification, to the host computer.

12. A host computer comprising:

a container runtime environment;

a receiving unit which is configured to receive a host-computer-specific integrity guideline;

an integrity-detection unit which is configured to check resources allocated to at least one container instance against the host-computer-specific integrity guideline; and an output unit which is configured to output an alarm message if a violation of the host-computer-specific integrity guideline was ascertained in a course of the checking;

wherein the host computer is further configured to transmit a notification to an orchestration device if one of the container instances on the host computer is terminated, and to receive an updated host-computer-specific integrity guideline in response to the notification.

13. An orchestration device comprising:

an integrity unit which is configured:

to create, in a course of the starting of a container instance in the container runtime environment by the orchestration device, an instance-specific integrity rule concerning at least one resource of the host computer that has been allotted for a purpose of executing the container instance; and to add the instance-specific integrity rule to a host-computer-specific integrity guideline which comprises an instance-specific integrity rule for each container instance already being executed in the container runtime environment of the host computer and which is arranged in the orchestration device; and an orchestration interface which is configured to communicate the host-computer-specific integrity guideline to the host computer;

wherein the orchestration device is further configured to receive a notification if one of the container instances on the host computer is terminated, and the orchestration interface is further configured to communicate a host-computer-specific integrity guideline, updated with respect to the notification, to the host computer.

14. A computer program product comprising a computer readable hardware storage device having computer readable program code stored therein, the program code executable by a processor of a computer system to implement a method as claimed in claim 1.

* * * * *